Dec. 31, 1940.   N. EVEN ET AL   2,226,556
IMPLEMENT HITCH
Filed Jan. 3, 1939   2 Sheets-Sheet 1
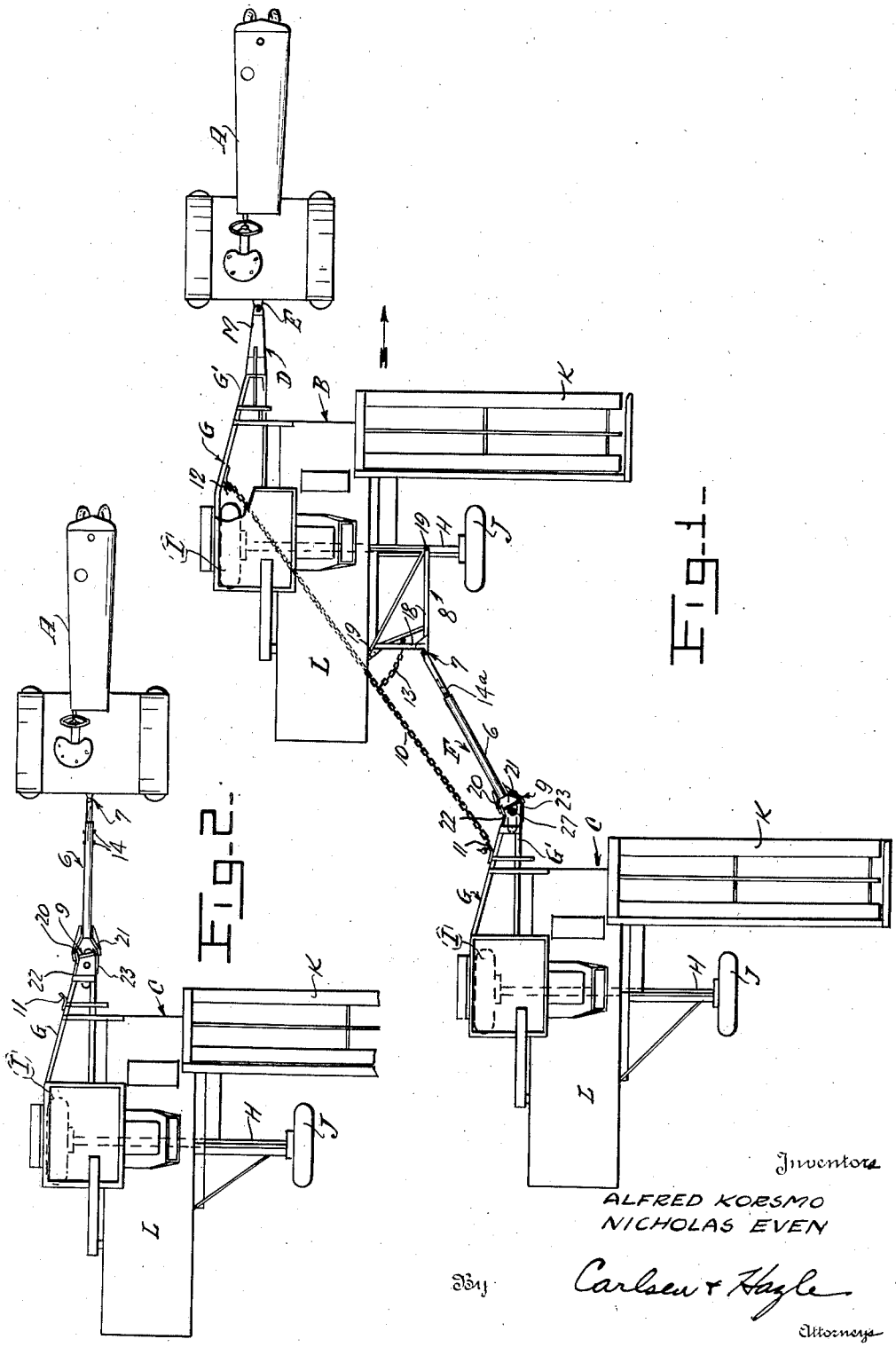
Inventors
ALFRED KORSMO
NICHOLAS EVEN
By Carlsen & Hagle
Attorneys

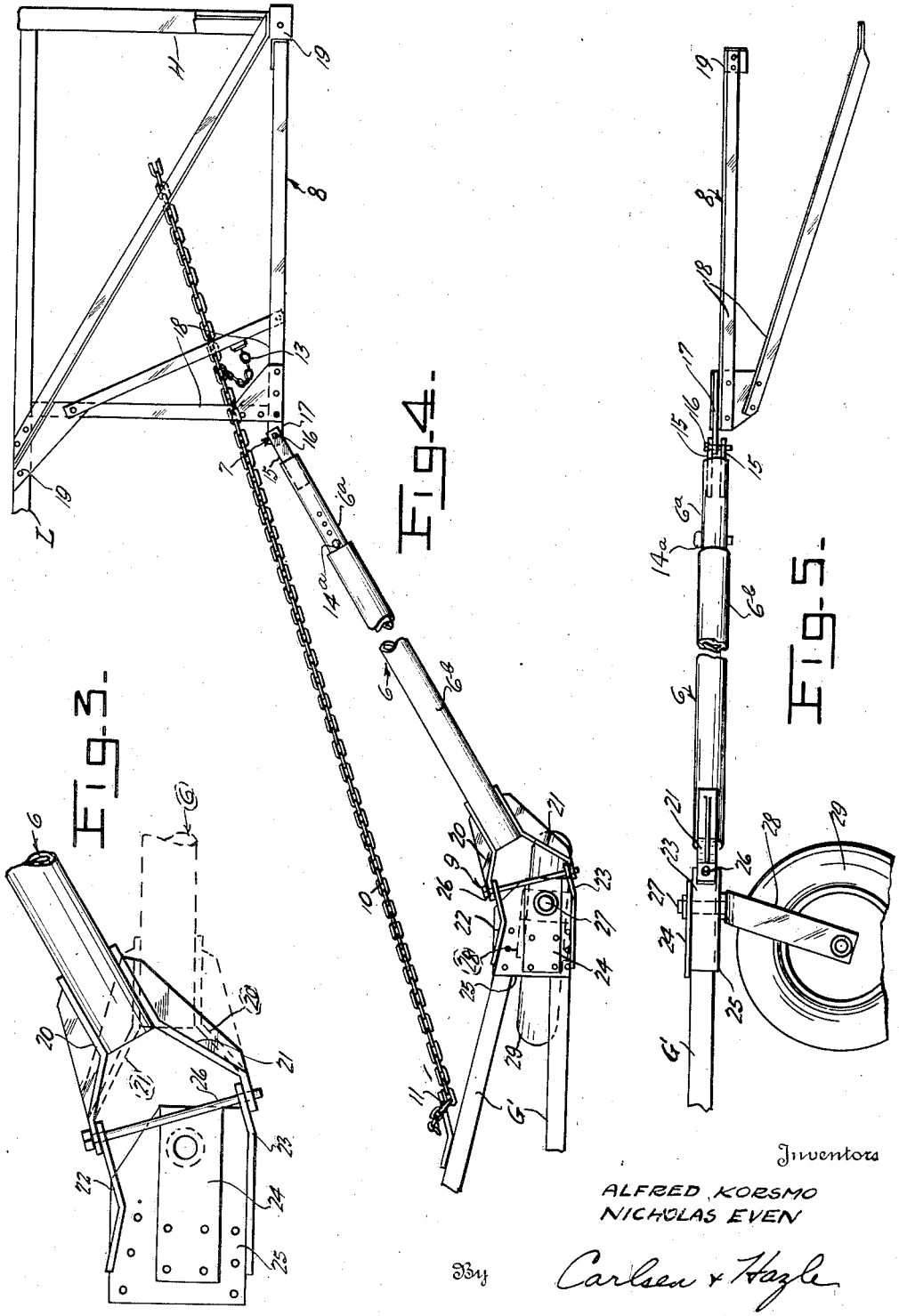

Patented Dec. 31, 1940

2,226,556

UNITED STATES PATENT OFFICE 2,226,556

IMPLEMENT HITCH

Nicholas Even, Minneapolis, and Alfred Korsmo, Hopkins, Minn., assignors to Minneapolis-Moline Power Implement Company, Minneapolis, Minn., a corporation of Delaware Application January 3, 1939, Serial No. 248,982

8 Claims. (Cl. 280—33.44)

This invention relates to improvements in implement hitches.

The primary object of the invention is to provide a hitch by means of which an implement or vehicle of any kind may be connected either to a draft or pulling device or to another preceeding implement where two or more implements are used in tandem. A further object is to provide a hitch device of this kind which embodies an angularly extended connecting and guide pole or tongue for normally guiding the pulled implement in a laterally offset position with respect to the line of travel of the pulling implement, so that the swath or area of operation of each of the implements upon the crop or ground will slightly overlap, and the extent or area of operation will be effectively doubled when two tandem implements are used. A further object is to provide an apparatus of this kind embodying a guide pole or tongue and a mounting for supporting the same at the proper offsetting angle when used between two implements, but in which mounting the pole is reversible so that, when the implement is used alone and connected directly to the pulling device, the pole will extend substantially parallel with the line of travel to cause the implement to properly trail the pulling device. The latter feature is also of advantage where it is necessary to transport the implements from field to field or in any case where the overall width of the tandem and offset implements would be undesirable. Still a further object is to provide a hitch of this kind in which the draft connection, where tandem implements are used, is made by means of a flexible draft chain extended between the implements, thus relieving the guide pole of the draft and permitting it to operate most effectively as a guiding means for maintaining the desired relative positions of the implements.

These and other more detailed and specific objects will be disclosed in the course of the following specification, reference being had to the accompanying drawings, in which—

Fig. 1 is a plan view of one implement arrangement employing our improved hitch assembly, the implements shown being combines for harvesting and threshing grain, and the pulling device being a tractor.

Fig. 2 is a plan view showing the pulled combine of Fig. 1 connected directly to the tractor, instead of to the other combine, and showing the guide pole or tongue in reversed position causing it to extend straightly forward.

Fig. 3 is an enlarged plan view of the rear end portion of the guide pole and its associated mounting means showing the pole, in full lines, in angular position, and in dotted lines in reversed straightforward position.

Fig. 4 is a plan view of the frontal portion of the pulled implement and connecting framework arranged on the rear lateral portion of the pulling implement, and showing also the guide pole and draft chain.

Fig. 5 is a side elevation of the assembly shown in Fig. 4.

Referring now more particularly and by reference characters to the drawings, A designates a pulling device such as a tractor, and B and C two implements or vehicles adapted to be drawn either singly or together, in tandem, laterally offset relation, behind the tractor. For tandem operation of the implements the frontal or pulling implement B is connected by the usual hitch D to the drawbar E of the tractor, and then between this pulling implement and the trailing or pulled implement C our invention, designated generally at F, is employed to carry the draft and properly offset the pulled implement relative to the line of travel of the frontal implement. Such offsetting is of course necessary so that the swaths or strips of crop or ground operated on by the implements may slightly overlap and thus substantially double the amount of work done by one implement alone.

The implements here shown are combines or the type of machines used in concurrently harvesting and threshing grain in the field, but it is of course understood that the present invention may be used with any other types of implements in which such use is possible. In every case, however, there will be found times when it is desirable to disconnect the implements and draw them singly behind the tractor. Such an instance would occur in transporting the implements between fields, and in which operation the overall width of the two offset implements would probably be much too great to pass through the usual gate, or to travel over roads or narrow lanes in transporting the implements. Our invention, therefore, provides a hitch or draft connection for inter-implement use which has provision for properly offsetting the trailing implement angularly and laterally for the purposes specified and which is in addition capable of being readily reversed when the trailing implement is pulled directly by the tractor so that the implement will trail properly in line behind the tractor. Of course the hitch might also be arranged to offset the implement directly from the tractor if such arrangement should at any time be necessary.

Going now into more detail, each combine conventionally includes a frame assembly G borne on a single transverse axle H and wheels I and J, and supporting the harvesting mechanism K and threshing mechanism L. These parts and their assembly and operation form no part of the present invention and should need no further description. The usual hitch for such implements, designated at D, comprises a forwardly directed extension G' of the frame and to which is affixed a short tongue M forming the actual pivoted and releasable connection to the tractor draw bar E. This type of hitch is left undisturbed in the forward combine which is in all cases connected directly to the tractor.

In providing the rear combine C with our invention the tongue, corresponding to M, is dispensed with and, in lieu thereof, a guide pole or tongue 6 is pivotally connected at its rear end to the frontal end of the frame extension G' of the rear combine and extends forwardly therefrom toward the rear of the frontal implement. This forward end of the guide pole 6 is pivotally mounted, for movement about a vertical axis, at 7 upon a draft frame 8 built on the rear, right hand or crop side of the frontal implement B rearwardly of the axle H. The pivotal connection of the rear end of the guide pole is upon a horizontal pin 9 to permit vertical movements of the rear implement as may be required by the contour of the ground over which it operates.

The draft connection is by a flexible member or chain 10 extended from a frontal left hand portion of the rear implement C to a somewhat medial, but forwardly located, left hand point of the frontal implement B, the chain thus extending angularly and forwardly from implement C beneath implement B. The ends of the chain are adjustably hooked or retained in brackets 11 and 12 secured to convenient portions of the implement frames G, and the length of the chain, its position on the two implements, and the length and pivotal connections of the guide pole 6 are all so proportioned and correlated that the rear implement C will be pulled by the frontal implement in a trailing and offset position such that the swath cut by the rear harvesting mechanism K will nicely overlap the swath cut by the forward mechanism K to the desired amount. A short tie chain 13 is extended between the draft frame 8 and the chain 10 to hold the latter clear of the ground and of the wheels when turning and otherwise to properly guide the same beneath the frontal implement.

In this operation of the implements the guide pole 6 has the important function of maintaining proper offsetting operation of the rear implement and of guiding the same at all times, as will appear.

The guide pole consists of two telescoped sections 6a and 6b which may be secured together by bolts 14 when only the rear combine is being pulled as in Fig. 2. The frontal section 6a has extended apertured ears 15 which receive the pin 16 forming the vertically axised frontal pivot 7 and which pin is inserted through an extension 17 of the draft frame 8. This frame may be of any suitable construction and arrangement according to the type of implement upon which it is mounted, and is here shown as made up of a cross braced L-shaped assembly 18 secured at 19 to the axle H and side of the harvesting mechanism L.

A stop or pin 14a is placed through one of a series of holes in the front pole section 6a and the chain 10 is adjusted to pull the rear section 6b up against this stop so that the pole will provide proper offsetting of the rear implement. At the same time the pole may extend or lengthen out as may be required when making a turn. The amount of offset may of course be varied by adjusting the stop 14a.

The rear end of the tongue is also provided with connecting means and is forked by welding or otherwise securing angularly formed fork arms 20 and 21 in place upon the section 6b so that their free apertured ends extend angularly and rearwardly. Upon the extension G' of the rear combine frame a pair of hitch members or bars 22 and 23 are mounted between upper and lower horizontal bearing plates 24 and 25, and these bars have apertured and forwardly extended ends which fit between the rear ends of the fork arms 20 and 21. The apertures in these adjacent ends of the parts are thus brought into registry and receive a draft pin or cross pin 26 which forms the rear pivotal connection 9 hitherto referred to. The fork arms and the hitch bars are so arranged and angularly extended that the pin 26 will lie in a substantially horizontal plane but at an angle to the transverse line of the implement as well as to the direction of travel. This arrangement is clearly shown in the drawings, and it will be noted that the pin angles rearwardly toward its inner end, while the fork arms 20 and 21 are so arranged that the tongue 6 will angle inwardly and forwardly toward the rear of the pulling implement B for proper guiding effect. However, this assembly has the outstanding characteristic of allowing the tongue 6 to be disconnected, by pulling the pin 26, turned over or reversed side to side, and reconnected to the draft bars 22 and 23, whereupon the tongue, due to the angular extension of the fork arms, will then extend in substantially a straight line forwardly from the implement as shown in Figs. 2 and 3. In this condition the tongue 6 may be provided with the aforesaid bolts 14 and connected to the tractor (Fig. 2) or other draft device, and will then act as the draft connection for pulling the implement along straightly behind the tractor, as will be readily evident.

The bearing plates 24 and 25 are apertured in vertically aligned positions to rotatably receive the swivel pin 27 of a caster wheel fork 28 which mounts a caster wheel 29 to run beneath the frontal end of the implement C, and serve as a truck to support the same. This fork bears upwardly beneath the bearing plate 25, as clearly shown.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a hitch for connecting a draft device and implement, a guide tongue comprising front and rear telescopic sections respectively connected to the draft device and implement, the said tongue being angularly extended to offset the implement with respect to the line of travel of the draft device, a stop mounted in the front tongue section and limiting forward movement of the rear section, a draft chain connected between the draft device and implement and adapted to be pulled taut to normally draw the rear tongue section against the stop, and the said stop being adjustable to vary the spacing and amount of offset between the implement and draft device.

2. A hitch for the connection of tandem implements, comprising a guide tongue connected at its ends between the implements and normally extended angularly with respect to the line of travel to offset the rear implement from the path of the forward implement, a draft member connected between the implements, the said tongue being longitudinally extensible and being normally collapsed by the tension of the draft member, and means for adjusting the guide tongue to a position extending straight forwardly from the rear implement and for securing the tongue against endwise extension in this position.

3. A hitch for the connection of tandem implements, comprising a guide tongue connected at its ends between the implements and normally extended angularly with respect to the line of travel to offset the rear implement from the path of the forward implement, a draft member connected between the implements, the said tongue being of telescopic construction with means for limiting collapsing movement to thereby adjust the amount of offset of the rear implement, the said draft member being tensioned to normally hold the tongue collapsed in the straight-away travel of the implements, means for adjusting the tongue to a position extending straight forwardly from the implement, and means for securing the tongue against lengthwise extension to serve as a draft device in its straight forwardly extended position.

4. A hitch for connecting two tandem arranged implements comprising a guide tongue angularly extended between front and rear implements to offset the rear implement laterally with respect to the path of the front implement, a flexible draft member extended between the implements for transmitting draft forces to the rear implement, the said draft member being connected to the implements at front and rear ends forwardly and rearwardly of the corresponding ends of the guide tongue and extending in a plane beneath the front end of the tongue to swing beneath the same as the implements are turned from the straightahead path, and the said guide pole being longitudinally extensible to permit proper trailing of the rear implement in making a turn.

5. A hitch for connecting two tandem arranged implements comprising a guide tongue angularly extended between front and rear implements to offset the rear implement laterally with respect to the path of the front implement, a flexible draft member extended between the implements for transmitting draft forces to the rear implement, the said draft member being connected to the implements at front and rear ends forwardly and rearwardly of the corresponding ends of the guide tongue and extending in a plane beneath the front end of the tongue to swing beneath the same as the implements are turned from the straightahead path, means loosely connecting an intermediate portion of the draft member to the front implement adjacent the front end of the guide tongue, and the said guide pole being longitudinally extensible to permit proper trailing of the rear implement in making a turn.

6. A hitch for connecting tandem arranged crop working implements, comprising a guide member angularly extending between front and rear implements to laterally offset the latter toward the crop, a flexible draft member connected between the implements on the sides thereof away from the crop, the said draft member being connected at front and rear ends forwardly and rearwardly respectively of the corresponding ends of the guide member, and extending at an intermediate portion beneath the front end of the guide member to swing therebeneath as the implements are turned in a direction toward the crop, and the said guide member being extensible to increase in length as the implements are turned in a direction away from the crop.

7. A hitch for connecting an implement to a draft device, comprising a guide tongue having pivotal connection about an upright axis at its forward end with the draft device, the rear end of the tongue being pivotally connected to the implement about a horizontal axis extending angularly with respect to the line of travel of the implement whereby the tongue may be disposed angularly to guide the implement in a path offset from the draft device, a draft connection between the draft device and implement, and the said tongue being reversible in its connection with the implement to a position parallel with the line of travel to cause the implement to travel directly in the path of the draft device.

8. A hitch for connection between an implement and a draft device, comprising a guide tongue releasably and pivotally connected at a forward end with the draft device, a fork on the rear end of the tongue, hitch members on the implement to engage the fork, a pin passed through the hitch members and fork and pivotally connecting the tongue to the implement, the said hitch members and the fork being angularly extended to dispose the pin at an angle to the line of travel and to support the tongue in an angular, forwardly, and laterally extending position with respect to the implement and the said connection of the fork with the hitch members being reversible to support the tongue in a position extending straight forwardly from the implement.

NICHOLAS EVEN.
ALFRED KORSMO.